UNITED STATES PATENT OFFICE.

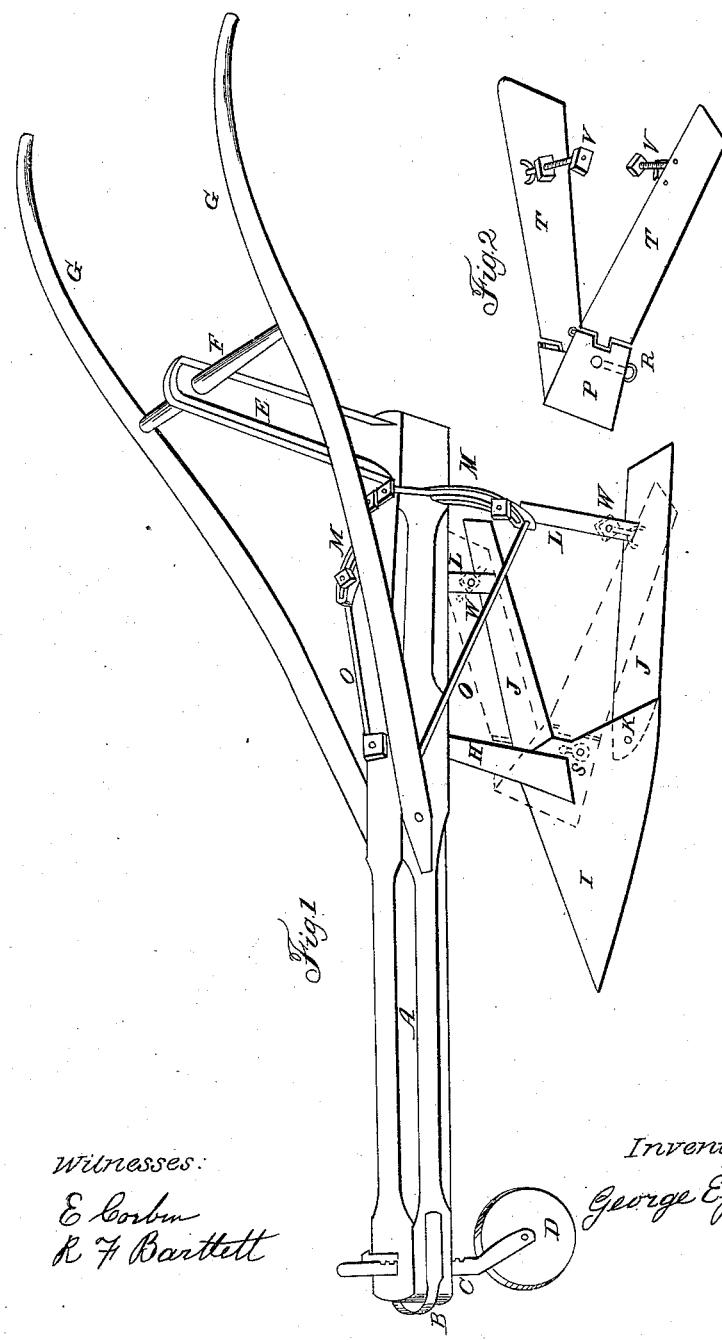

GEORGE ESSINGTON, OF PLAINFIELD, ILLINOIS.

IMPROVEMENT IN CULTIVATORS.

Specification forming part of Letters Patent No. 22,860, dated February 8, 1859.

*To all whom it may concern:*

Be it known that I, GEORGE ESSINGTON, of Plainfield, in the county of Will and State of Illinois, have invented certain new and useful Improvements in Cultivators; and I do hereby declare that the same are described and represented in the following specifications and drawings.

To enable others skilled in the art to make and use my improvements, I will proceed to describe the construction and operation, referring to the drawings, in which the same letters indicate like parts in each of the figures.

Figure 1 is a perspective view of a cultivator with my improvements when used as a weeder when the crops are small. Fig. 2 is a perspective view of the vibrating mold-boards to be applied to Fig. 1, as shown by dotted lines, when the crops are large enough to be hilled.

The nature of my invention and improvements in cultivators consists in the arrangement of the mold-boards and center piece, in combination with the standard, point, and shares, as will be hereinafter described.

In the accompanying drawings, A is the beam, provided with a clevis, B, by which it may be drawn, and with an adjustable standard, C, carrying the wheel D, by which the working depth of the cultivator may be regulated. The beam A may be made in the form shown or in such other form as will answer the purpose, and provided with a standard, E, for the bar F, which supports the handles G G, the fore ends of the handles being fastened to the beam A, as shown in the drawings.

H is a colter or standard, firmly fastened to the beam A and to the triangular point I, the forward edges of which should be thin and sharp, so as to sever the roots of the weeds readily.

J J are two shares connected to the point I by bolts, like K, so as to vibrate when required to set the cultivator wide or narrow to suit the rows of crops. The standards L L are fastened to the shares J J, and their upper ends are narrowed and fitted to traverse in the arms M M, in which arms they may be fastened, so as to make the cultivator work wide or narrow, by the screw-nuts N N on the tops of the standards L L, as shown in the drawings. The arms M M are provided with slots, made in the arc of a circle, for the upper ends of the standards L L to be adjusted and fastened. These arms are firmly fastened to the beam A, and their outer ends are braced by the rods O O, as shown in Fig. 1.

I have now described my cultivator as it is used for a weeder when the crops are small and do not want hilling, and will next describe the mold-boards to be applied to it to hill the crops when they have grown larger.

P is a center piece, Fig. 2, bent in the middle, so as to form an acute angle, and fitted to the colter H and point I, and provided with two bolts, like R, fitted to holes in the point I, one of which holes is shown at S, Fig. 1, to which point I it may be fastened by said bolts. To each end of this center piece, P, the mold-boards T T are hinged, so as to vibrate and be set nearer together or farther apart to suit the width of the rows of crops to be cultivated. The bolts V V are hinged or fastened to the mold-boards T T, so as to pass through the holes W W in the standards L L, and are provided with two nuts each, which may be screwed against the standards, so as to adjust the mold-boards at such distances from the standards as may be desired. By this construction it will be seen that the shares may be set near together and the mold-boards far apart, if desired. The position of the center piece and mold-boards on the cultivator is shown by dotted lines in Fig. 1.

Having described my improvements so as to enable any person skilled in the art to make and use them, I claim—

The arrangement of the mold-boards T T, center piece, P, in combination with the colter or standard, H, point, I, and shares J J, the whole being constructed substantially as described, for the purposes set forth.

GEORGE ESSINGTON.

Witnesses:
R. F. BARTLETT,
E. CORBIN.